United States Patent [19]

Chang

[11] Patent Number: 5,473,974
[45] Date of Patent: Dec. 12, 1995

[54] COMPACT COFFEE MAKER

[76] Inventor: Kwei T. Chang, No. 14, Lane 54, Luong Chuan St., Panchiao City, Taipei Hsien, Taiwan

[21] Appl. No.: 260,347

[22] Filed: Jun. 15, 1994

[51] Int. Cl.[6] .................................................. A47J 31/12
[52] U.S. Cl. ............................................................ 99/310
[58] Field of Search .............................. 99/308, 309, 310, 99/311, 312, 313, 314, 315, 307, 300, 302 R, 279; 426/433

[56] References Cited

U.S. PATENT DOCUMENTS

| | | | |
|---|---|---|---|
| 3,856,435 | 12/1974 | Ballard | 99/310 |
| 3,991,664 | 11/1976 | Yamato | 99/310 |
| 4,170,931 | 10/1979 | Fajans | 99/312 |
| 4,642,443 | 2/1987 | Jorgen | 99/308 |

*Primary Examiner*—Robert W. Jenkins
*Attorney, Agent, or Firm*—Browdy and Neimark

[57] ABSTRACT

A compact coffee maker can prevent the dirt and ashes enter into the pot body and the handle has an excellent heat isolating capability. This compact coffee maker includes a pot body, a conduit, a filter, and a pot base. The pot body is made from carafe and is provided with a spout. The washer is disposed at the outside of the external threaded slot, accordingly, there is not a leakage found between the pot body and the pot base. The conduit is disposed within the external threaded slot and the filter is disposed at the opening of the pot body. The conduit passes through the center opening of the filter and the permeable section of the conduit will spray the hot water onto the filter radially. When the lid is lowered down, the curve slot is met with the spout of the pot body. By this arrangement, the coffee can be directly poured onto a cup without removing the lid. On the other hand, the lid with a curve slot is disposed on the pot body, the dirt and the ashes will not fall onto the pot body. The I-shape handle has a quick heat transfer. A convenient, safe and convenient coffee maker is ensured.

1 Claim, 5 Drawing Sheets

COMPACT COFFEE MAKER

BACKGROUND OF THE INVENTION

This invention relates to a coffee maker, more particularly, to a compact coffee maker which has a carafe made from reinforced glass. On the other hand, the brewing process of the coffee can be readily seen through the carafe. Accordingly, the user can also enjoy the brewing process of the coffee. The delivering pipe which has one end emerges into the water and the other end which has a permeable section is above the filter basket, accordingly, the hot water is sprayed onto the filter basket through the permeable section to melt the coffee powder into the water. Besides, the filter basket is separated from the carafe, as a result, the coffee can be poured into the cup without the interference of the filter basket.

For a conventional percolator, it has a brewing and warming element at the base. A reservoir for holding water is disposed above the brewing and warming element. The reservoir further includes a lid which has a conduit at therein. The lid, reservoir and the brewing and warming element are consolidated to a single body. A brewing basket for holding coffee powder is disposed within the reservoir. The brewing basket is provided with a filter. In brewing the coffee, the vapor is generated when the water is boiling. The vapor is condensed into hot water droplet when the vapor meets the conduit of the lid. Accordingly, the coffee powder is melt into the hot water droplet. No doubt, this coffee maker can provide a coffee, but with poor taste. Then reasons are 1) the formation of the droplet is very slow; and 2) there is not a barrier provided between the brewing basket and the atmosphere, accordingly, the dirt or ashes may fall into the coffee. On the other hand, the water is evaporated continuously as the power is on. If the cup is too large, it is possible to exhaust the water completely, but the user has no idea about it. On the other hand, it is also possible to scatter out the water for some reasons, but the user has also no idea about it. These are the defects of the conventional coffee maker.

SUMMARY OF THE INVENTION

It is the object of this invention is to provide a coffee maker which can solve the defects of the conventional coffee maker completely.

The compact coffee maker provided by this invention has been tested and it brings an excellent performance.

In order to achieve the object set forth, the compact coffee maker made according to this invention includes a pot body which is made from carafe, accordingly, the user can readily enjoy the brewing process of the coffee. The pot body further includes a handle with an I-shape cross section which provides a large quantity of heat transferring area. Accordingly, the handle is never too heat to touch during the brewing process.

It is still the object of this invention to provide a compact coffee maker which has a compact configuration and can be manufactured in a comparative low cost. It is really an excellent design.

BRIEF DESCRIPTION OF THE DRAWINGS

The structural and operational characteristics of the present invention and its advantages as compared to the known state of the prior art will be better understood from the following description, relating to the attached drawings which show illustratively but not restrictively the example of a compact coffee maker. Wherein.

DETAILED DESCRIPTION OF THE PREFERRED EMBODIMENT

Figure 1:
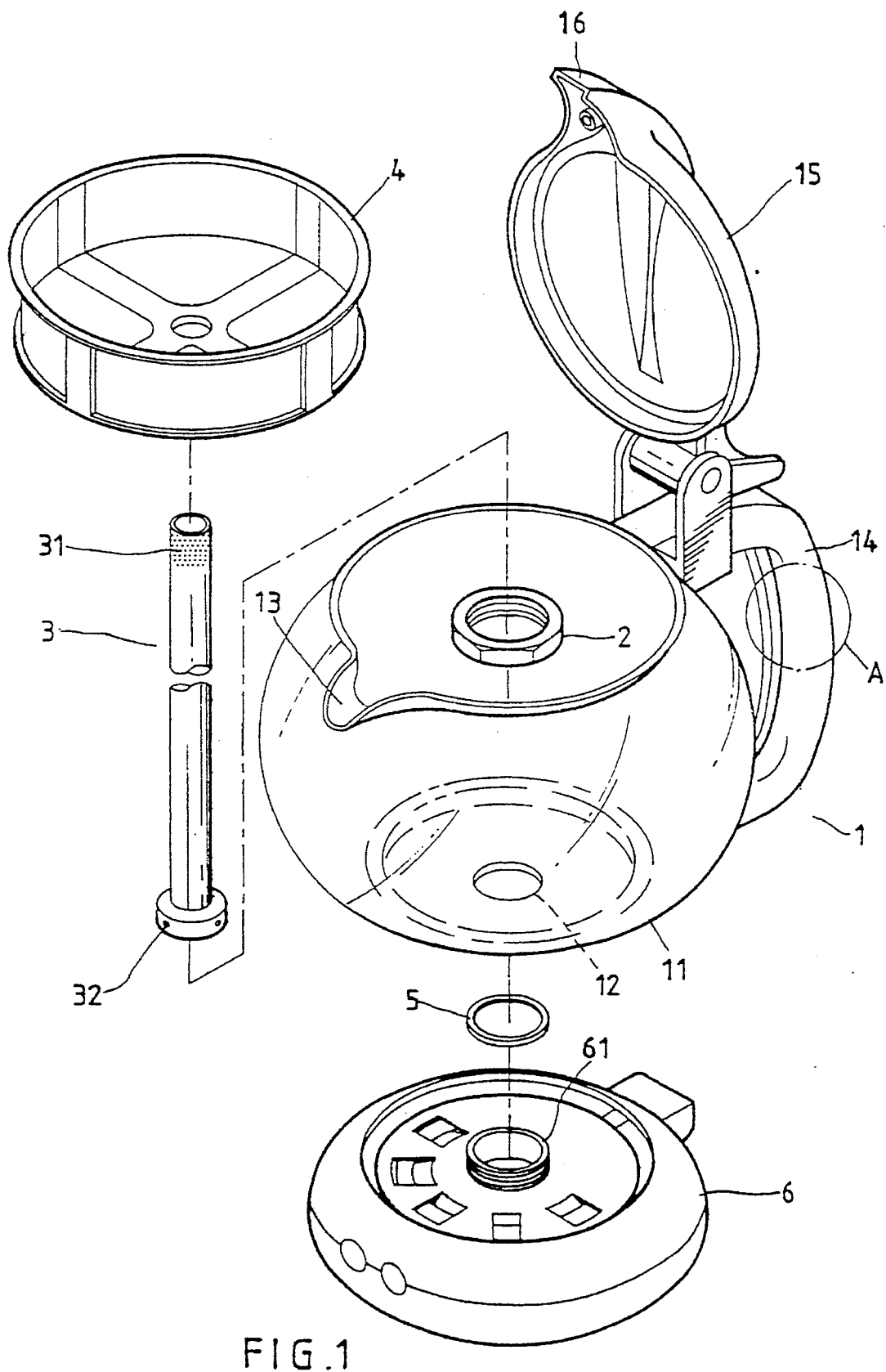
FIG. 1 is an exploded perspective view of the compact coffee maker made according to this invention.
Figure 1A:
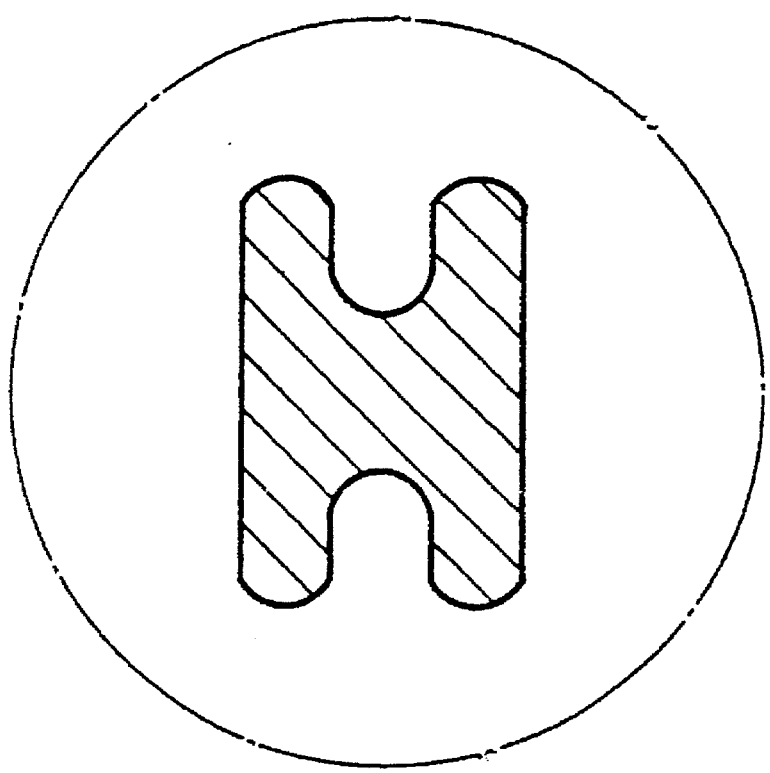
FIG. 1A is an enlarged cross-sectional view of circled area A in FIG. 1.
Figure 2:
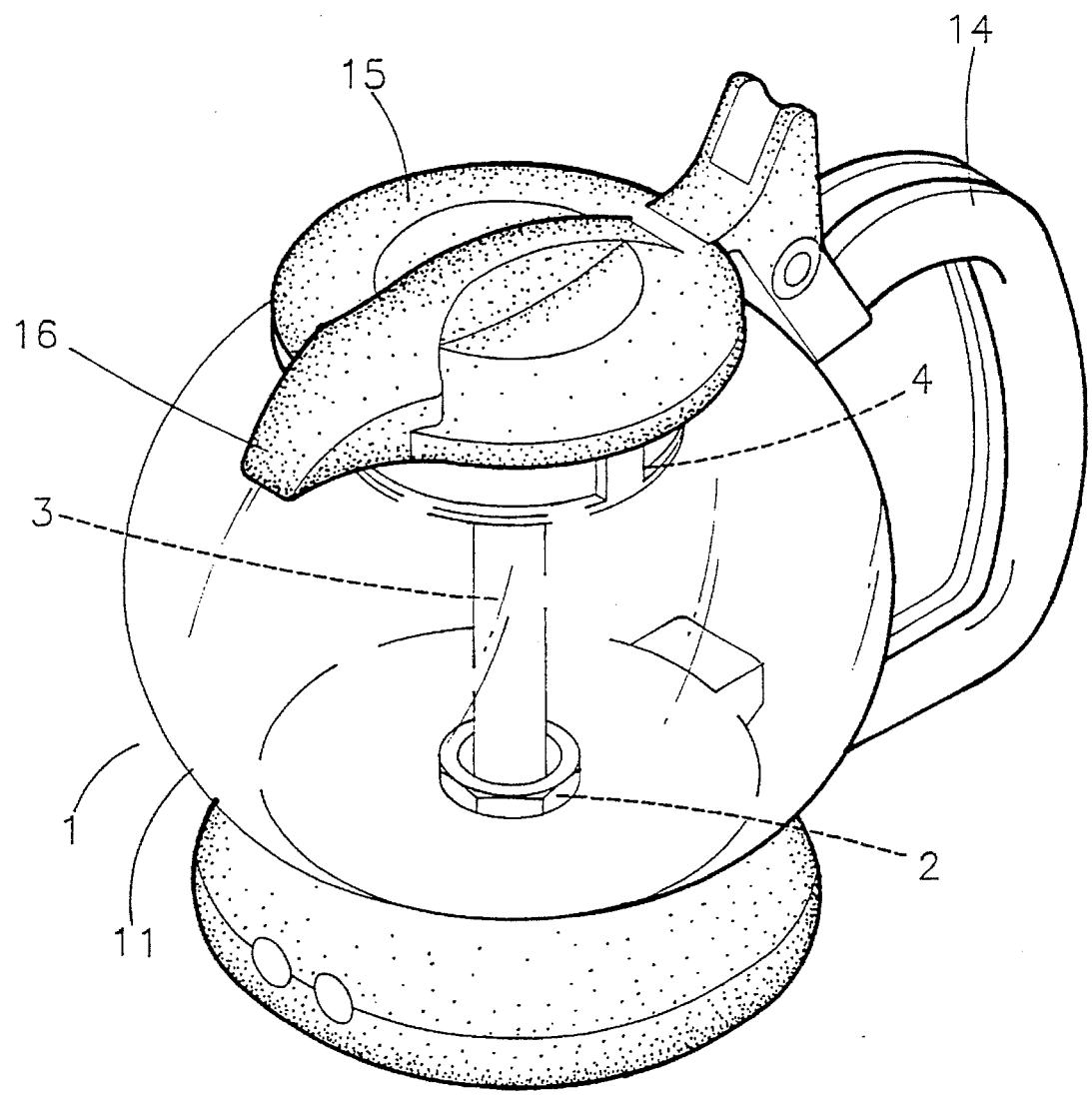
FIG. 2 is a perspective view of an assembled compact coffee maker.
Figure 3:
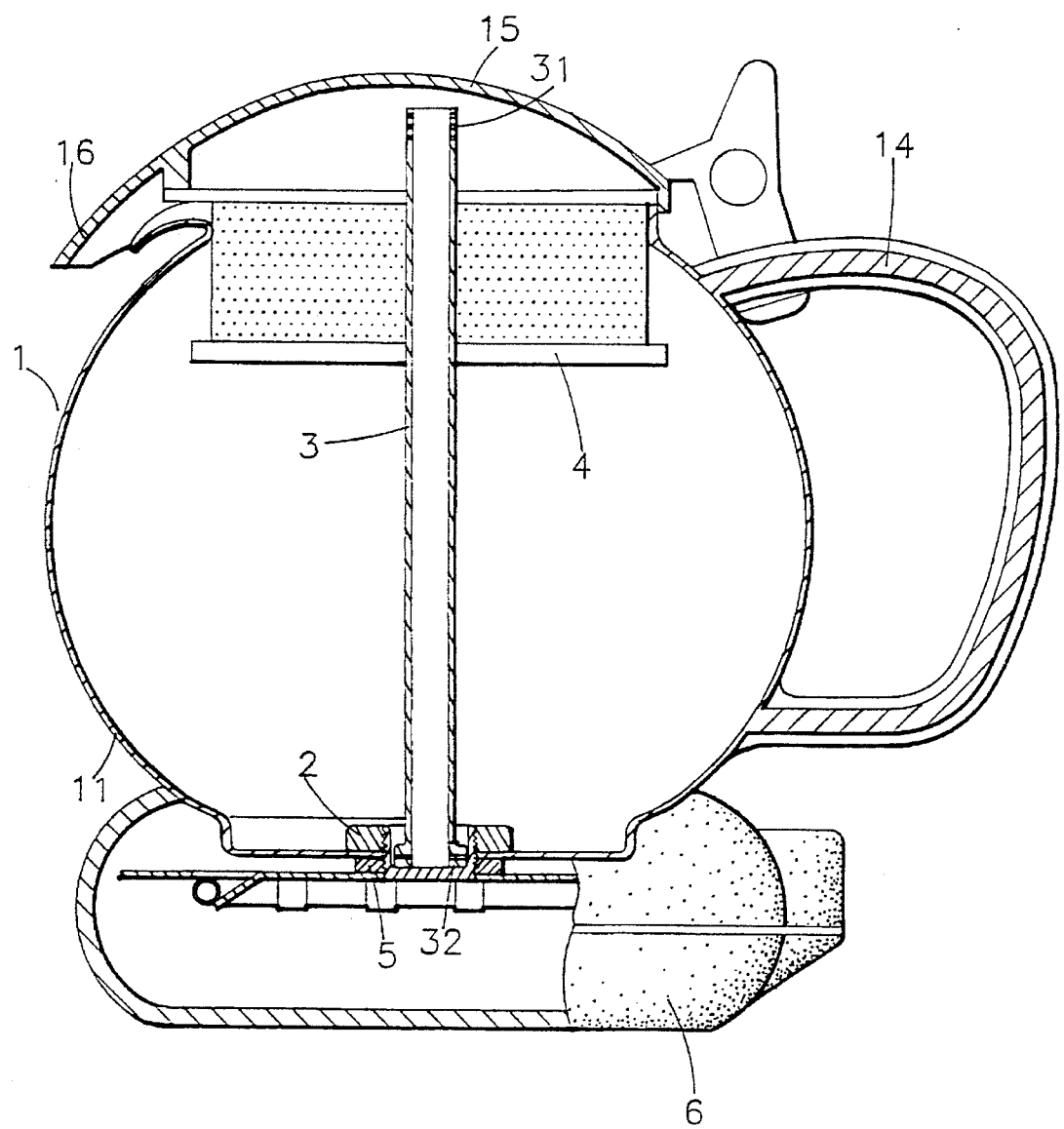
FIG. 3 is a cross sectional view of the compact coffee maker made according to this invention.
Figure 4:
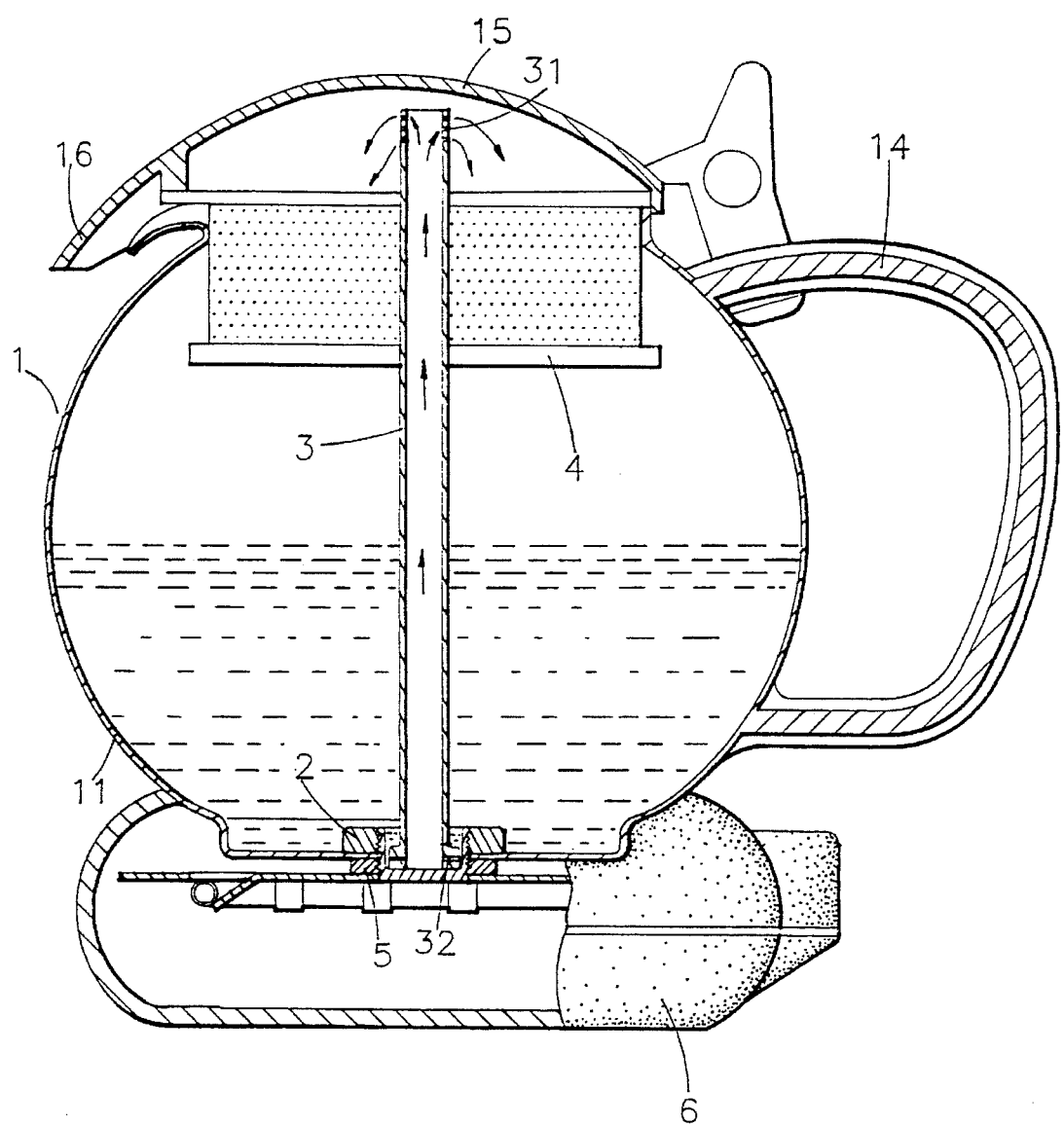
FIG. 4 is a sketch view of the compact coffee maker showing the brewing process of the coffee.

Referring to FIGS. 1, 2 and 3, specially in FIG. 2. The compact coffee maker made according to this invention includes a pot body 1, a conduit 3, a filter 4, and a pot base 6.

The pot body 1 has a carafe 11 configuration which is made from reinforced glass. An inlet 12 is provided at the bottom of the carafe 11. A spout 13 is provided at one end and the opposite end is provided with an I-shape handle 14. The lid 15 is pivoted on the handle 14 and a curve spout 16 is provided thereunder.

The nut 2 is made from stainless steel.

The conduit 3 is provided with a permeable section 31 which is constructed by a plurality of orifices at the upper end. The conduit is provided with an inlet 32 at the lower end.

A filter 4 is provided with an opening 41 at the center of the filter.

A washer 5 is provided.

A pot base 6 is provided with a threaded slot 61 at the center.

By combination of these above described elements, a compact coffee maker is made.

In assembling, the washer 5 is disposed at outside of the external threaded slot 61. The spout 12 of the carafe body 11 is disposed at the outside of the external threaded slot 61. The nut 2 is used to lock the pot body 11 onto the external threaded slot 61. Accordingly, the water will not leak to the pot base 6. The conduit 3 is disposed at the external threaded slot 61. The filter 4 is disposed at the opening of the pot body 11. The conduit 3 passes through the center opening 41 of the filter 4. When the lid 15 is lowered down, the curve slot 16 is covered onto the spout 13. By this arrangement, the dirt and ashes will never fall into the filter 4, as clearly shown in FIGS. 1 and 3.

Referring to FIG. 2, in brewing the coffee, the water is filled to the level lower than the filter 4. Then suitable amount of coffee powder is added to the filter 4. And then the heating element which disposed within the pot base 6 is active to heat the water. When the vapor is continuously generated, the vapor pressure increases accordingly, as a result, the water below the vapor is pressed to enter the inlet 32 of the conduit 3. At last, the hot water is sprayed to the filter 4 to melt the coffee powder.

The compact coffee maker made according to this invention can be concluded with the following advantages.

1. The pot body is made from carafe and an inlet is provided at the bottom of the carafe. This configuration is an unique design. On the other hand, the brewing process is readily enjoyed. Besides, an I-shape handle provides a larger heat transferring area, as a result, the handle will never too hot to touch.

2. The lid of the carafe is provided with a curve slot which can completely cover on the spout of the pot body. Accordingly, the ashes and dirt can never enter the carafe. Besides, the coffee can be readily pour out without removing the lid, a more convenience in pouring coffee is achieved.

3. The filter is disposed at the opening of the pot body and the conduit passes through the opening of the filter. The conduit is provided with a permeable section which includes a plurality of orifices. When the water is boiling, the water will spray over the filter through the permeable section. By this arrangement, the coffee powder is readily melted. A coffee with good taste is achieved.

Although the present invention has been described in connection with preferred embodiment thereof, many other variations and modifications will now become apparent to those skilled in the art without departing from the scope of the invention. It is preferred, therefore, that the present invention not be limited by the specific disclosure herein, but only by the appended claim.

I claim:

1. A compact coffee maker, comprising:

a pot body having a carafe configuration, being made from reinforced glass, and including a hole through a pot body bottom, an upper opening at an upper pot body end, a pouring spout provided adjacent the upper opening at a first side of said pot body, an I-shaped handle provided at a second side of said pot body opposite said first side, and a lid, for covering said upper opening, having a curved spout;

a conduit including a permeable section at an upper conduit end having a plurality of orifices and an inlet at a lower conduit end;

a pot base including at a center thereof an externally threaded cup having a central upper recess for receiving the lower conduit end;

a washer being disposed outside of and surrounding the externally threaded cup;

a nut, threadably mating with the externally threaded cup, to lock the pot body onto the pot base and to compress the washer between an outer surface of the pot body bottom adjacent the hole and the pot base adjacent the externally threaded cup;

a filter having a center opening passing therethrough the upper conduit end, said filter being supported by the upper opening of the pot body, whereby the filter is spaced a predetermined distance from the recess and said permeable portion of said conduit is disposed at an upper portion of said filter to spray hot water onto said filter;

wherein said curved spout meets said pouring spout when said lid covers said upper opening.

* * * * *